(12) United States Patent
Kawaguchi et al.

(10) Patent No.: US 7,744,036 B2
(45) Date of Patent: Jun. 29, 2010

(54) METHOD FOR DESIGNING AN ORBIT OF A SPACECRAFT

(75) Inventors: Junichiro Kawaguchi, Sagamihara (JP); Kohta Tarao, Sagamihara (JP)

(73) Assignee: Japan Aerospace Exploration Agency, Tokyo (JP)

( * ) Notice: Subject to any disclaimer, the term of this patent is extended or adjusted under 35 U.S.C. 154(b) by 61 days.

(21) Appl. No.: 11/490,344

(22) Filed: Jul. 19, 2006

(65) Prior Publication Data

US 2010/0108819 A1    May 6, 2010

(30) Foreign Application Priority Data

Jul. 20, 2005    (JP)    ............... 2005-210266

(51) Int. Cl.
*B64G 1/10* (2006.01)
(52) U.S. Cl. .................................. 244/158.4
(58) Field of Classification Search ............ 244/158.1, 244/158.4–158.8
See application file for complete search history.

(56) References Cited

U.S. PATENT DOCUMENTS

| 4,795,113 | A | | 1/1989 | Minovitch |
| 5,183,225 | A | * | 2/1993 | Forward .................... 244/168 |
| 6,385,512 | B1 | | 5/2002 | Belbruno |
| 6,809,818 | B2 | | 10/2004 | Hillis et al. |

OTHER PUBLICATIONS

Roberts, Craig, Sun-Earth L1 Region Halo-to-Halo and Halo-to-Lissajous Orbit Transfers, 2004, AI Solutions, pp. 1-6.*
AI Solutions, Technical Paper Library, p. 4.*
ESA/NASA, Schematic Diagram of SOHO's Orbit, Jan. 9, 2004, ESA, p. 1.*
NASA, SOHO Orbit Schematic, p. 1.*
NASA, RLP Coordinate System, p. 1.*
Min Xin, et al., "Stationkeeping of an $L_2$ Libration Point Satellite with θ-D Technique", Proceeding of the 2004 American Control Conference, Jun. 30, 2004-Jul. 2, 2004, pp. 1037-1042, XP002407945, Boston, Massachusettes, USA.
Kulkarni J. Campbell M., "Asymptomatic Stabilization of Motion about an Unstable Orbit: Application to Spacecraft Flight in Halo Orbit", Proceeding of the 2004 American Control Conference, Jun. 30, 2004-Jul. 2, 2004, pp. 1025-1030, XP002407946, Boston, Massachusettes, USA.
Gomez G, et al., "Libration Point Orbits: A Survey from the Dynamical Point of View", Proceedings of the International Conference on Libration Point Orbits and Applications, Jun. 10, 2002-Jun. 14, 2002, pp. 1-9 and pp. 30-37, XP002407947, Begur, Girona, Spain.

(Continued)

*Primary Examiner*—Timothy D Collins
*Assistant Examiner*—Valentina Xavier
(74) *Attorney, Agent, or Firm*—Blakely, Sokoloff, Taylor & Zafman LLP

(57) ABSTRACT

A method is disclosed for designing an orbit of a spacecraft which allows the spacecraft to take a small-radius halo orbit near a Lagrange point while avoiding the prohibited zone where the spacecraft may be shadowed or might be prevented from making communication. The method makes it possible to have a closed orbit although being similar to a Lissajous orbit, under a restricted condition where a propulsion force magnitude applied to a spacecraft is fixed, and where it rotates at a constant angular velocity, based on the equation of motion close to a Lagrange point. The method also provide a theory for guiding/controlling the orbit of a spacecraft, that is, the embodiment of the above orbit design method.

9 Claims, 13 Drawing Sheets

OTHER PUBLICATIONS

Dunham D. W., Farquhar R. W.: Libration Point Missions, 1978-2002, Proceedings of the International Conference on Libration Point Orbits and Applications, Jun. 10, 2002-Jun. 14, 2002, XP002407948, Begur, Girona, Spain.

Farquhar, R. W. et al., "Mission Design for a Halo Orbiter of the Earth", AIAA/AAS Astrodynamics Conference, San Diego, CA, Aug. 18-20, 1976, pp. 170-177.

Farquhar, R. W., The Flight of ISEE-3/ICE: Origins, Mission History, and a Legacy, , AIAA/AAS Astrodynamics Specialists Conference, Boston, MA, Aug. 10-12, 1998, pp. 1-59.

European Search Report, EP Application No. 06117482.7, Dec. 13, 2006, 3 pages.

* cited by examiner $\omega$=2.0082, Z:MINUS

ω=2.0082, Z:PLUS

ω=1.7136, Z:MINUS

NUMERICAL VERIFICATION OF AN ORBIT DESIGNED BY
THE INVENTIVE METHOD IN THE REAL CELESTIAL SYSTEM
COMPRISING THE SUN, EARTH AND MOON
($\omega$=1.7136, Z:MINUS)

NUMERICAL VERIFICATION OF AN ORBIT DESIGNED BY
THE INVENTIVE METHOD IN THE REAL CELESTIAL SYSTEM
COMPRISING THE SUN, EARTH AND MOON
($\omega$=2.0082, Z:MINUS)

METHOD FOR DESIGNING AN ORBIT OF A SPACECRAFT

CROSS-REFERENCE TO RELATED APPLICATIONS

The present patent application claims priority from Japanese Patent Application No. 2005-210266, filed on Jul. 20, 2005.

FIELD OF THE INVENTION

The present invention relates to a method for designing an orbit of a spacecraft to move in a cosmic space, particularly to a method for designing an orbit of a spacecraft which enables the spacecraft to be on a small-radius halo orbit near a Lagrange point while avoiding the prohibited zone where the spacecraft may be shadowed or might be prevented from making communication.

BACKGROUND OF THE INVENTION

Take, as an example, a system consisting of two celestial bodies where both bodies turn around the bury-center, a center of masses of two bodies, taking a circular orbit like the Earth and the Sun, and a vary light third body flying in the system. It has been known that there are five equilibrium points in the system where gravity from those two bodies and a centrifugal force acting on a third body are balanced. They are known as Lagrange points. The practical implication of the Lagrange points has been studied for a long time. Among the five equilibrium points, Lagrange points, the points L1 and L2 allow a spacecraft, a third body, to be comparatively easily accessed because there the pseudo potential is relatively low. In view of this, this invention attempts an observatory or a space dock spacecraft to be stationary on the point in order to extract the merit that the position and the geometry of the observatory or the dock is frozen with respect to the Sun or the Earth.

As stated above, although accessing and positioning to/at the point L1 or L2 are easier than those to/at the other Lagrange points, it does not readily mean that placing a spacecraft on the point is easy without any consideration about the initial conditions around the point. For example, initial conditions corresponding to divergent motion that may occur around the point must be avoided deliberately. The orbits around L1 or L2, if those improper divergent motions are eliminated, are basically stable and seem suitable for the purposes discusses here. The characteristic frequency of the orbital motion around the point L1 or L2 takes different values for in-plane and out-of-plane directions. Accordingly, while the orbit of the spacecraft is stable, usually it does not draw a closed locus, but takes a so-called Lissajous locus.

When a spacecraft takes a Lissajous orbit around the point L2, the orbit may be shadowed by the Earth. And when a spacecraft takes a Lissajous orbit around point L1, the ground station will see the Sun behind the spacecraft and the communication between the ground stations and the spacecraft may be disturbed significantly. These problems have prevented the use of the L1 or L2 point, and also have not realized the spacecraft on the above-mentioned Lissajous orbit around the Lagrange points L1 or L2.

By the way, it has been revealed by previous studies that if a Lissajous orbit is enlarged to a much more large scale one to enter into a non-collinear area, the non-linear effect makes the spacecraft trajectory closed. And the orbit of a spacecraft, if the spacecraft is positioned close to point L2, can avoid shadow by the Earth, and if the spacecraft is positioned close to point L1, can avoid passage in front of the Sun. When viewed from the Earth, it looks like a halo around the Sun, and thus it is called a halo orbit.

Following patent documents deal with the orbits around the Lagrange points and the halo orbits, i.e., U.S. Pat. Nos. 6,809,818; 6,385,512; 4,795,113; and 5,183,225.

SUMMARY OF THE INVENTION

As stated above, the natural halo orbit is advantageous on the fact that it is stable and draws a closed locus without any special artificial correction operation maintaining the motion. However, the natural halo orbit disadvantageously leads to an extraordinarily large orbit which must depart from a co-linear line connecting two celestial bodies. The distance may be as large as, for example, about one million km from the Lagrange point referred to here. The resulted natural Halo orbits around point L1 or L2 are too far and very much apart from the aimed points originally. Because of this, the merit associated with the halo orbits, that is, no maintenance of the position of a spacecraft is needed, is inevitably lost, if the trajectory size is controlled and maintained artificially. Furthermore, if it is required for a spacecraft to make a docking with another spacecraft moving along the same natural halo orbit, the period required until docking will be prolonged. Thus, the merits of the natural halo orbit around a Lagrange point are not utilized for various applications. Currently a number of spacecrafts take natural halo orbits, for example, around the L2 point to make astronomical observations, but the merits characteristic of the halo orbits are not yet fully made use of, leaving the most merits abandoned. Thus, there is a need for a novel method by which the merits of a halo orbit can be extracted and become available more effectively via artificial method of taking a non-Keplerian orbit (non ballistic) instead of pure natural motion.

If a spacecraft is intended to be on a closed trajectory at a very vicinity of the point L1 or L2, obviously the spacecraft must rely on a mighty propulsion means to make the spacecraft to be on a non-Keplerian orbit. This might be still possible, however, if performed via chemical propulsion engines, a tremendous amount of fuel is required and is concluded far from practical.

If a spacecraft launched into an improper orbit and makes correction via a chemical propulsion, a considerable fuel is needed to reach a proper orbit, and such will significantly affect the operation life of the spacecraft, and causes a lot of operational restriction. And if a spacecraft orbit is corrected via an electric energy of a battery, fuel may be saved, but, battery energy is too small to have an intended amount of acceleration to a proper orbit. Because of these difficulties, having a concise halo orbit around L1 or L2 has still remained difficult by now.

In view of this situation, there has been a demand for a novel method for attaining a concise halo orbit using an existing propulsion means, while at the same time enabling the spacecraft to fully extract the merit of a Lissajous orbit, i.e., relatively passively stabilized in a broad sense.

The first three documents cited above deal with Lagrange points. However, U.S. Pat. No. 6,809,818 only touches upon the observation that an observatory space station may be placed on the point L1 or L2, and does not give any mention about a station keeping scheme. U.S. Pat. No. 6,385,512 only deals with the modification of a flight path to reach an orbit around a Lagrange point, and not with the control and maintenance of an orbit as does the present invention. U.S. Pat. No. 4,795,113 deals with the launching of a spacecraft into space from the Earth, and not with the control and maintenance of an orbit as does the present invention. U.S. Pat. No. 5,183,225 mentions possible applications expected from a spacecraft moving on a conventional ballistic natural halo orbit, but does not refer to the realization of a concise halo orbit as claimed by the present invention. As seen from above, the foregoing documents do not disclose any technical innovation possibly leading to the solution of the problem, which is the realization of a concise halo orbit, confronted and solved by the present invention.

In view of these situations, the present invention aims to provide a method for designing a spacecraft orbit, a special Lissajous orbit whose frequency ratio is one to one, that is, at the same time, an artificial halo orbit in the form of a closed, stable, small-radius circuit at a close proximity of a Lagrange point, while keeping a stable position relative to the Sun and the Earth, and a method for guiding/controlling the spacecraft to be positioned on the said orbit.

The inventive design method for placing a spacecraft on the said orbit comprises the steps of providing a celestial system consisting of a first body and a second body in a cosmic space where both bodies revolve around the bury-center of the two bodies, a center of masses of the two bodies, in a circular orbit, and a spacecraft, a third body, equipped with a propulsion mechanism resides on the line connecting those two bodies, around an equilibrium point near the second body, and implementing a coordinate system with respect to the celestial system such that a line connecting the first and second bodies is made a fixed axis, a second axis on the revolution plane, perpendicular to the first axis, and a line perpendicular to the revolution plane of the two bodies is made a third axis, with a plane spanned between the fixed and third axes being made a first plane, and a site where the spacecraft is intended positioned close to a Lagrange point on the fixed axis where gravity from the two bodies are balanced with a centrifugal force resulting from revolution motion, wherein the propulsion mechanism of spacecraft is activated such that a propulsion vector having a specified fixed magnitude rotates at a specified fixed angular velocity so as to make the orbit of spacecraft projected onto a second plane depict a concise halo orbit that shows a closed small-radius circuit retaining a passive stability characteristic associated with a Lissajous orbit, the second plane being a plane perpendicular to a given line on the first plane consisting of the fixed axis and the third axis.

Another inventive method for designing an orbit of a spacecraft comprises, in relation to the aforementioned celestial system placed on the foregoing coordinate system, controlling the orbit of spacecraft by activating its propulsion mechanism such that a propulsion force vector has a rotation motion on a second plane perpendicular to a given line on the first plane consisting of the fixed and the third axis, that a propulsion vector rotates at a specified fixed angular velocity on a second plane perpendicular to the given line, that a propulsion vector has the direction that coincides with the radial direction of a circular orbit projected on a second plane perpendicular to a given line on the first plane, or that a propulsion vector has the direction that coincides with the radial direction of a circular orbit depicted on a second plane perpendicular at a given line in parallel with the fixed axis on the first plane.

DESCRIPTION OF THE PREFERRED EMBODIMENTS

The preferred embodiments of the invention will be described in detail below with reference to the attached drawings.

Figure 1:
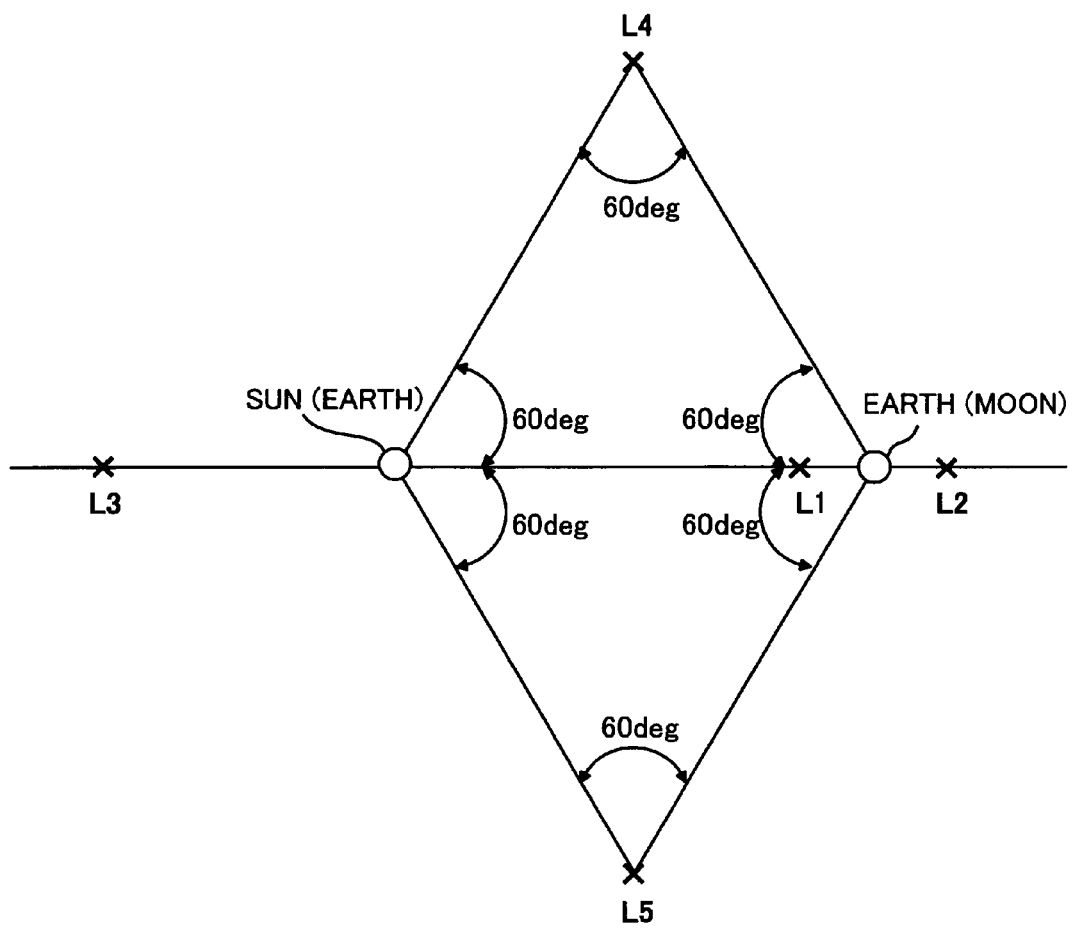
FIG. 1 illustrates five Lagrange points with particular reference to their positions relative to the celestial bodies.

Take, as an example, a system comprising two celestial bodies (for example, the Earth and the Moon) having a comparatively large mass, and a body having a comparatively small mass (for example, artificial satellite) where both bodies revolve around the bury-center, a center of masses of the two large bodies system, in a circular orbit, and the small body resides close to the former body. It has been known that there are five equilibrium points along the line connecting the two bodies where the small body can be stationary relative to the other two larger bodies. They are known as Lagrange points, and called Lagrange points L1, L2, . . . , L5. FIG. 1 illustrates five Lagrange points with particular reference to their positions relative to the two larger bodies. As shown in the figure, the points L1 to L3 are located on a line connecting the two celestial bodies (the Earth and the Sun in FIG. 1) while points L4 and L5 are located at a summit of opposite equilateral triangles with the distance between the two celestial bodies serving as a base.

The spacecraft may serve as a space station to engage in astronomical observation. Ideally, such a spacecraft has an aperture on its top surface for a telescope housed in the upper portion, a small, heat-insulated ion engine in its lower portion, with one lateral surface having a specified slope a solar cell and a heat reflector, and a heat radiator on the opposite surface. The spacecraft may be operated to make a turn once a half year about the Sun-Earth axis, and a station keeping strategy involving the attitude control may be devised to maintain the position and attitude requirement mentioned above.

The spacecraft may also serve as an intermediate relay station to and from which another spacecraft can leave for and return from deep solar system and beyond. Then, it may be necessary to apply a thrust along the station axis to maintain the station location around the intended site near a Lagrange point. The direction of propulsive force coincides with the radial direction of a circular orbit whose projected locus draws a circuit onto a reference plane. Thus, the intermediate relay station will be able to admit those spacecraft using the station without amending the attitude, while it continues the station-keeping.

Description will be given below on the premise that the first celestial body is represented by the Sun and the second celestial body by the Earth.

For the Sun-Earth system, the equation of motion of a spacecraft around the Lagrange point L2 can be expressed as follows. The same equation will also be true for the point L1.

The symbols used in the equations have following meanings. The center of combined masses of the Sun and the Earth is taken as the original point, a bury-center. The original balanced point, a Lagrange point discussed here is represented by L2. A line passing from the Sun to the Earth is taken as x-axis. A line drawn in the direction in which the Earth revolves around the Sun is taken as y-axis. A line normal to the ecliptic plane of the Earth is taken as z-axis. When the spacecraft on L2 receives a propulsive acceleration a, $a_x$, $a_y$, and $a_z$ represent the x-, y- and z-components of the acceleration a, respectively. $\mu$ represents the ratio of the mass of Earth against the (mass of Sun+mass of Earth). $\gamma_L$ is a dimensionless value representing the distance between the Earth and point L2 divided and normalized by the Sun-Earth distance. $r_1$ and $r_2$ represent dimensionless distances of the spacecraft from the Sun and Earth, respectively.

$$\ddot{x} - 2\dot{y} - (x + 1 - \mu + \gamma_L) = \quad \text{Equation (1)}$$
$$-\frac{1-\mu}{r_1^3}(x+1+\gamma_L) - \frac{\mu}{r_2^3}(x+\gamma_L) + a_x$$
$$\ddot{y} + 2\dot{x} - y = -\frac{1-\mu}{r_1^3}y - \frac{\mu}{r_2^3}y + a_y$$
$$\ddot{z} = -\frac{1-\mu}{r_1^3}z - \frac{\mu}{r_1^3}z + a_z$$

The same equation will also apply to a spacecraft around the point L1. If equation (1) is linearized, the following equation will be obtained.

$$\ddot{x} - 2\dot{y} - (2B_L + 1)x = a_x \quad \text{Equation (2)}$$
$$\ddot{y} + 2\dot{x} + (B_L - 1)y = a_y$$
$$\ddot{z} + B_L z = a_z$$

where $$B_L = \left\{\frac{1-\mu}{(1+\gamma_L)^3} + \frac{\mu}{\gamma_L^3}\right\}$$

If the spacecraft has following initial values for the linearized equation (2), $$x(0) = z(0) = 0, \dot{x}(0) = \frac{\omega_{xy}}{k}y(0), \dot{z}(0) = \pm\omega_z y(0)$$

The solutions to the equation (2) consist of different solutions depending on whether the orbit is in the ecliptic plane or out of the plane. The solutions, having different angular frequencies, take the form of following Lissajous orbits, which are not closed.

$$x(t) = \frac{y(0)}{k}\sin\omega_{xy}t, \; y(t) = y(0)\cos\omega_{xy}t, \; z(t) = \pm y(0)\sin\omega_z t \quad \text{Equation (3)}$$

$$\text{where} \quad k = \frac{\omega_{xy}^2 + 2B_L + 1}{2\omega_{xy}}$$

Figure 2:
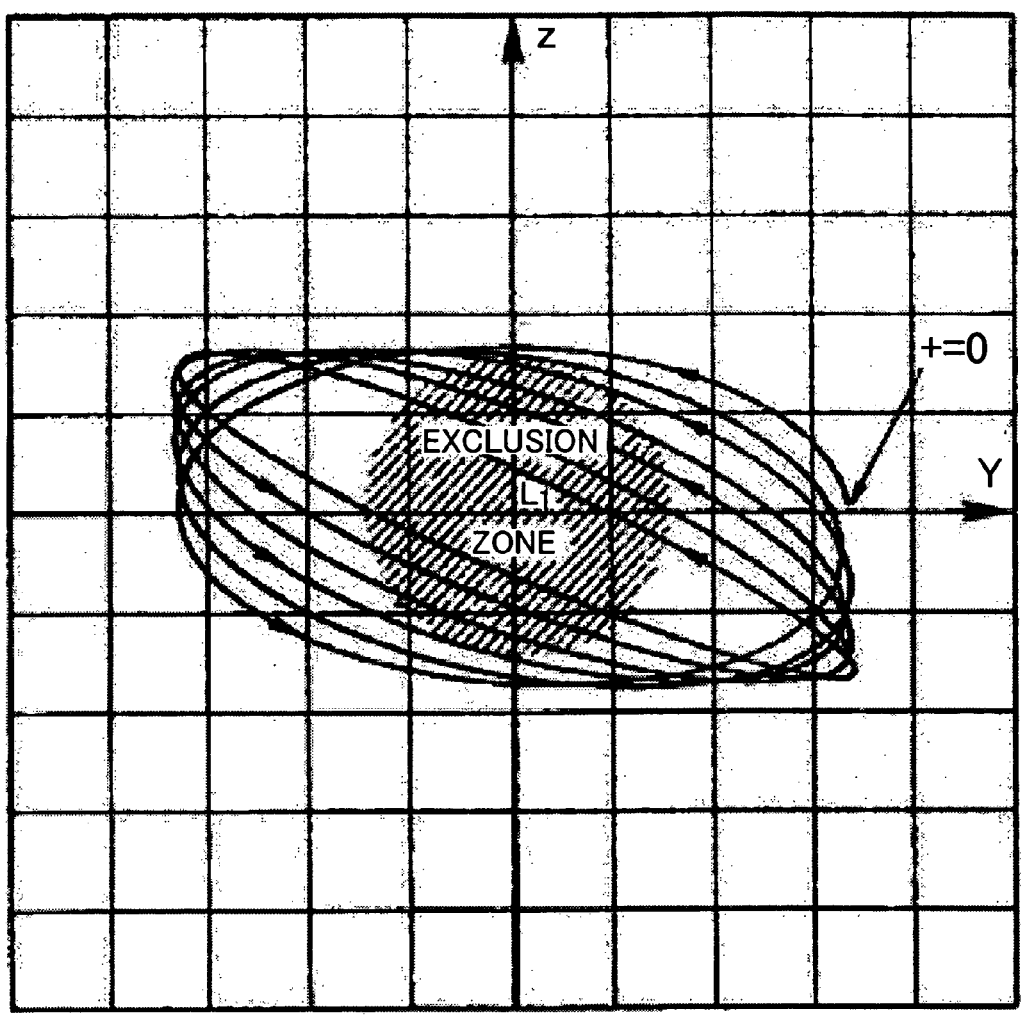
FIG. 2 illustrates the trajectory of a Lissajous orbit.
Figure 3:
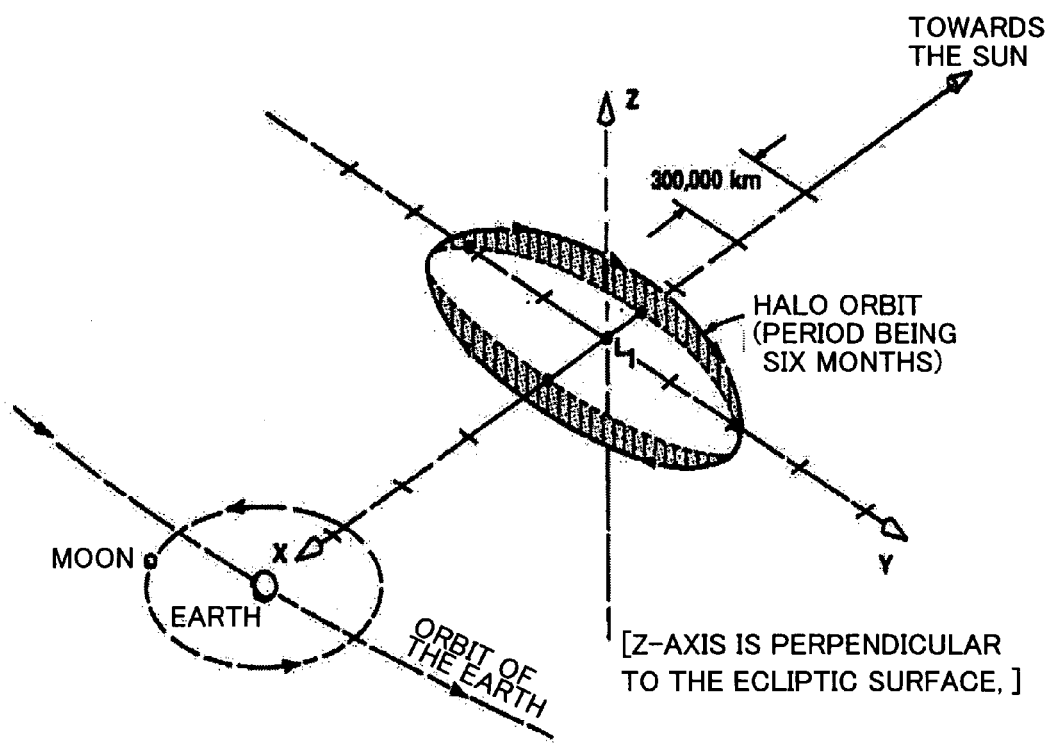
FIG. 3 illustrates the disposition of a halo orbit with respect to the three axes of a coordinate system.

FIG. 2 (Farquhar, R. W. et. al., "Mission Design for A Halo Orbiter of the Earth", AIAA/AAS Astrodynamics Conference, San Diego, Calif., Aug. 18020, 1976.) illustrates the trajectory of an exemplary Lissajous orbit. The trajectory exhibits a closed elliptic locus when the size is drastically enlarged and a non-linear effect governs. It is designated a natural halo orbit. FIG. 3 (Farquhar, R. W., "The Flight of ISEE3/ICE: Origins, Mission History and a Legacy", AIAA/AAS Astrodynamics Specialists Conference, Boston, Mass., Aug. 10-12, 1998.) illustrates the position and the shape of a natural halo orbit with respect to the three axes of the coordinate system. However, the size is too large to be regarded stationary near the Lagrange point L1 and L2 any more.

Assume an orbit, particularly a closed circuit approximating the Lissajous orbit as follows.

$$x(t) = k'y(0)\sin\omega t, \; y(t) = y(0)\cos\omega t, \; z(t) = \pm y(0)\sin\omega t \quad \text{Equation (4)}$$

Where k' and $\omega$ are arbitrary constants.

If the equation (4) is satisfied, it will be ensured that the orbit projected on a y-z plane or, in other words, on a plane perpendicular to x-axis takes the form of a circular halo orbit. The circular halo orbit realized and obtained at point L1 help a spacecraft relieved of communication disturbances due to the Sun. On the other hand, the circular halo orbit obtained at point L2 will help a spacecraft avoid shadow.

For a spacecraft to reach an orbit assumed as above, the propulsion mechanism must be present to provide an appropriate acceleration to the spacecraft. The propulsion thrust vector a, being assumed to vary with time at a constant angular frequency, may be expressed as follows.

$$a = \begin{pmatrix} a_x \sin\omega t \\ a_y \cos\omega t \\ a_z \sin\omega t \end{pmatrix} \quad \text{Equation (5)}$$

An assumed solution expressed by equation (4) and a propulsion force vector expressed by equation (5) are inserted into the linearized equations of motion (2), the following equation (6) below is obtained.

$$[\{(-\omega^2 - 2B_L - 1)k' + 2\omega\}y(0) - a_x]\sin\omega t = 0,$$

$$\{(-\omega^2 + B_L - 1 + 2\omega k')y(0) - a_y\}\cos\omega t = 0,$$

$$\{\mp(\omega^2 - B_L)y(0) - a_z\}\sin\omega t = 0 \quad \text{Equation (6)}$$

For equation (6) to have a real answer at any given time, following equation (7) must have real answers.

$$a_x = \{2\omega - (\omega^2 + 2B_L + 1)k'\}y(0),$$

$$a_y = (-\omega^2 + B_L - 1 + 2\omega k')y(0),$$

$$a_z = \mp(\omega^2 - B_L)y(0) \quad \text{Equation (7)}$$

Moreover, since the magnitude of propulsion force is assumed fixed, equation (8) below must be satisfied.

$$(a_x^2+a_z^2)\sin^2\omega t+a_y^2\cos^2\omega t=Cons\tan t \qquad \text{Equation (8)}$$

This can be modified to equation (9) below.

$$a_x^2+a_z^2=a_y^2 \qquad \text{Equation (9)}$$

Equation (9) means that a force vector can not be kept on a plane where $a_y=0$, that is a first plane, a plane perpendicular to y-axis.

When equation (7) is inserted into equation (9), and the resulting equation is arranged in terms of k', a dimensionless amplitude ratio, a following second-order equation in terms of k' is obtained.

$$\{\omega^4+(4B_L-2)\omega^2+(2B_L+1)^2\}k'^2-12\omega B_L k'+2\omega^2+2B_L-1=0 \qquad \text{Equation (10)}$$

For the k' value satisfying equation (10) to be real, its discrimination function D must be D>0, that is, $$(6\omega B_L)^2-\{\omega^4+(4B_L=2)\omega^2+(2B_L+1)^2\}(2\omega^2+2B_L-1)>0 \qquad \text{Equation (11)}$$

Namely, equation (10) may not give real answers depending on the value of angular velocity ω. Conversely, provided that the angular velocity ω falls within a certain range, real dimensionless amplitude ratios k's will be obtained.

Figure 5:
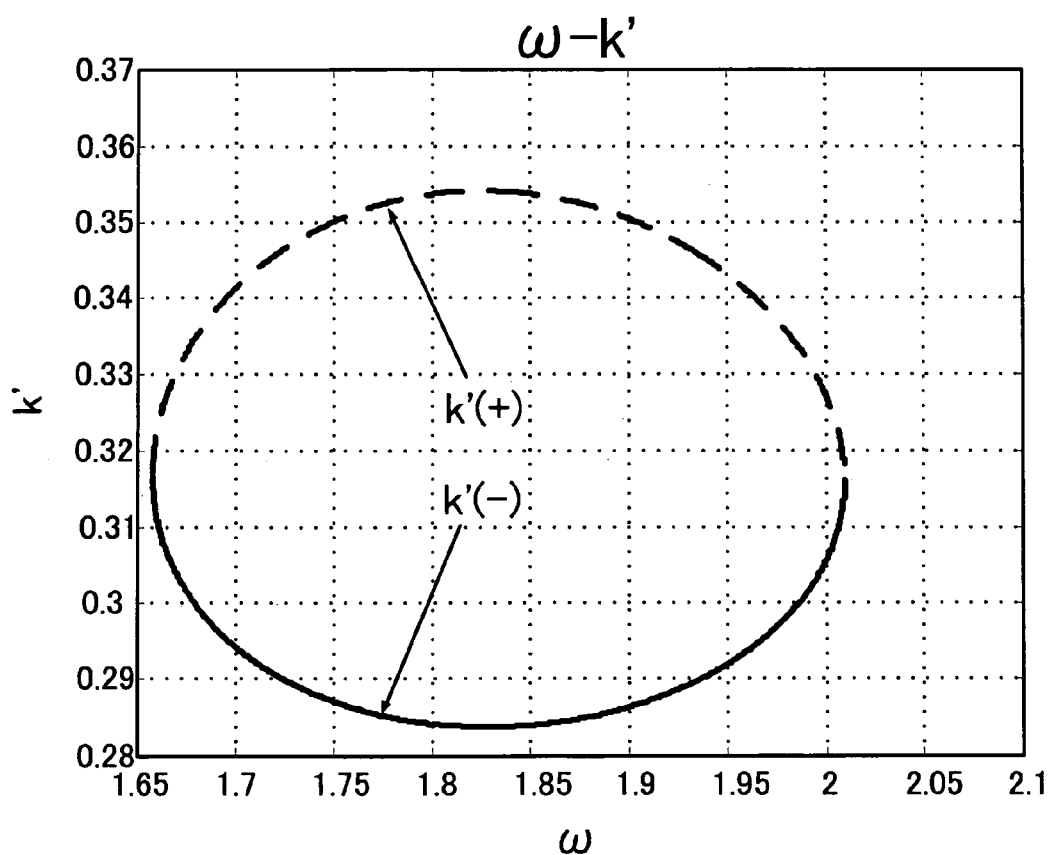
FIG. 5 shows the range of k' values compatible with a range of angular velocity $\omega$.

When ω, being assumed to be ω>0, that satisfies equation (11) is sought by calculation, it is found that ω falls within the following range satisfying equation (11).

$$1.6581<\omega<2.0091 \qquad \text{Equation (12)}$$

ω represents the dimensionless angular velocity of the spacecraft orbiting in the Sun-Earth system. The spacecraft orbiting with the angular velocity ω=1 revolves around the Sun once per one year. Thus, equation (12) indicates that the period of the spacecraft orbit will be about half a year. Namely, the small-radius halo orbit the spacecraft will trace should have a period of about 0.7 to 0.5 year. When the dimensionless amplitude ratio k' compatible with the above range of ω is sought by calculation, a closed circuit as shown in FIG. 5 is obtained.

Figure 6:
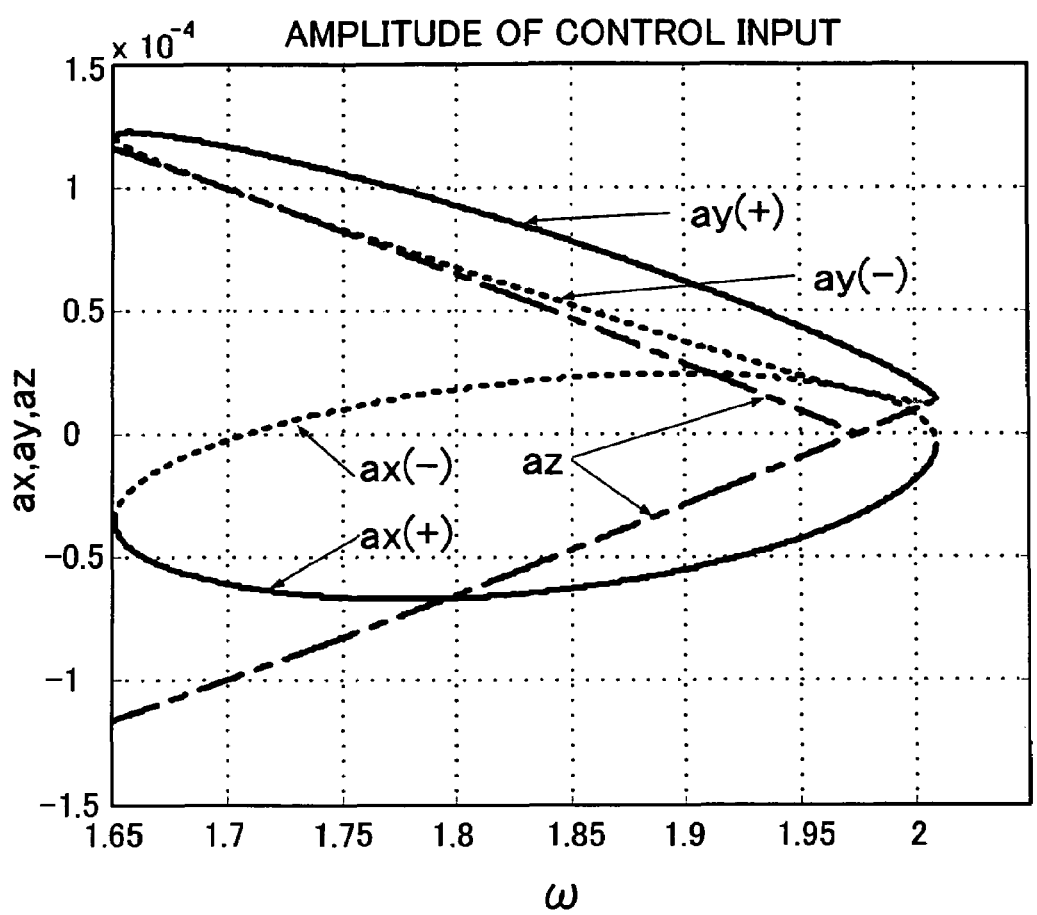
FIG. 6 illustrates the components (x, y, and z-components) of propulsion vector obtained from the graph of FIG. 5.
Figure 7:
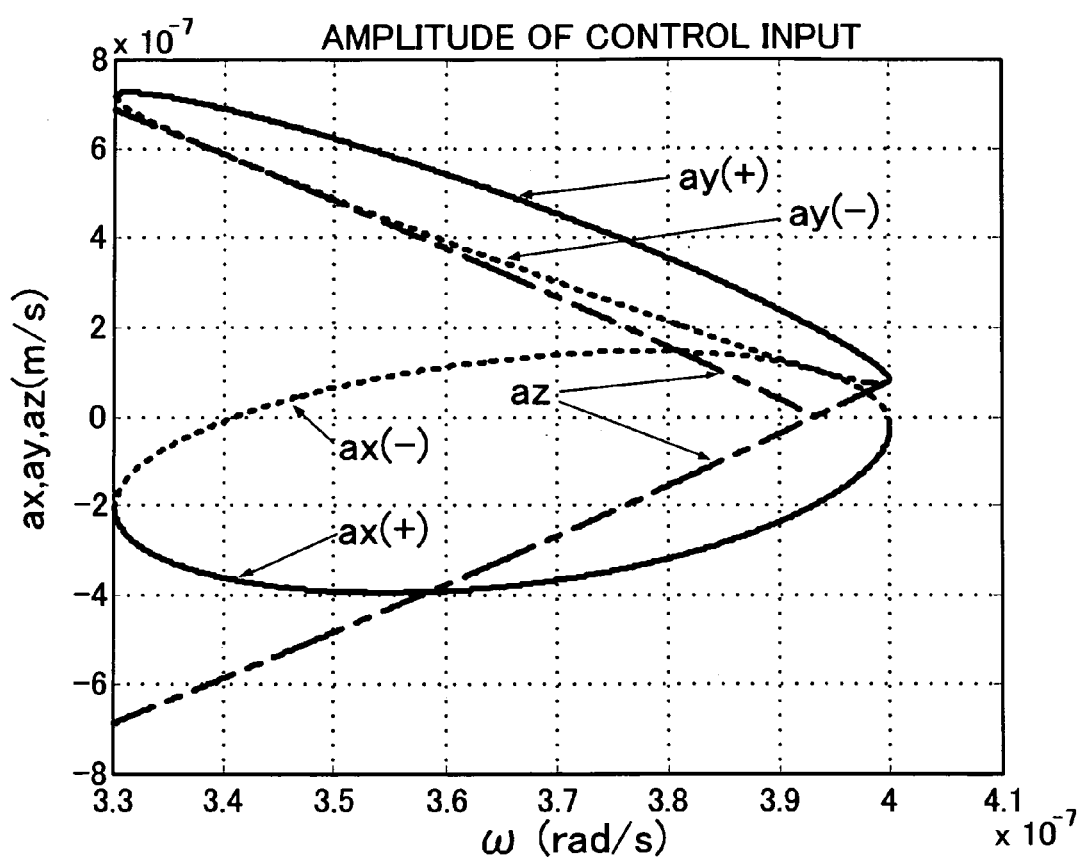
FIG. 7 is a graph corresponding to that of FIG. 6 expressed in terms of real dimensions.

When the respective components of propulsion vector as a function of ω are sought by calculation, acceleration components as shown in FIG. 6 are obtained. The corresponding acceleration components are obtained, when the involved parameters are expressed in terms of proper dimensions are as shown in FIG. 7.

Figure 4:
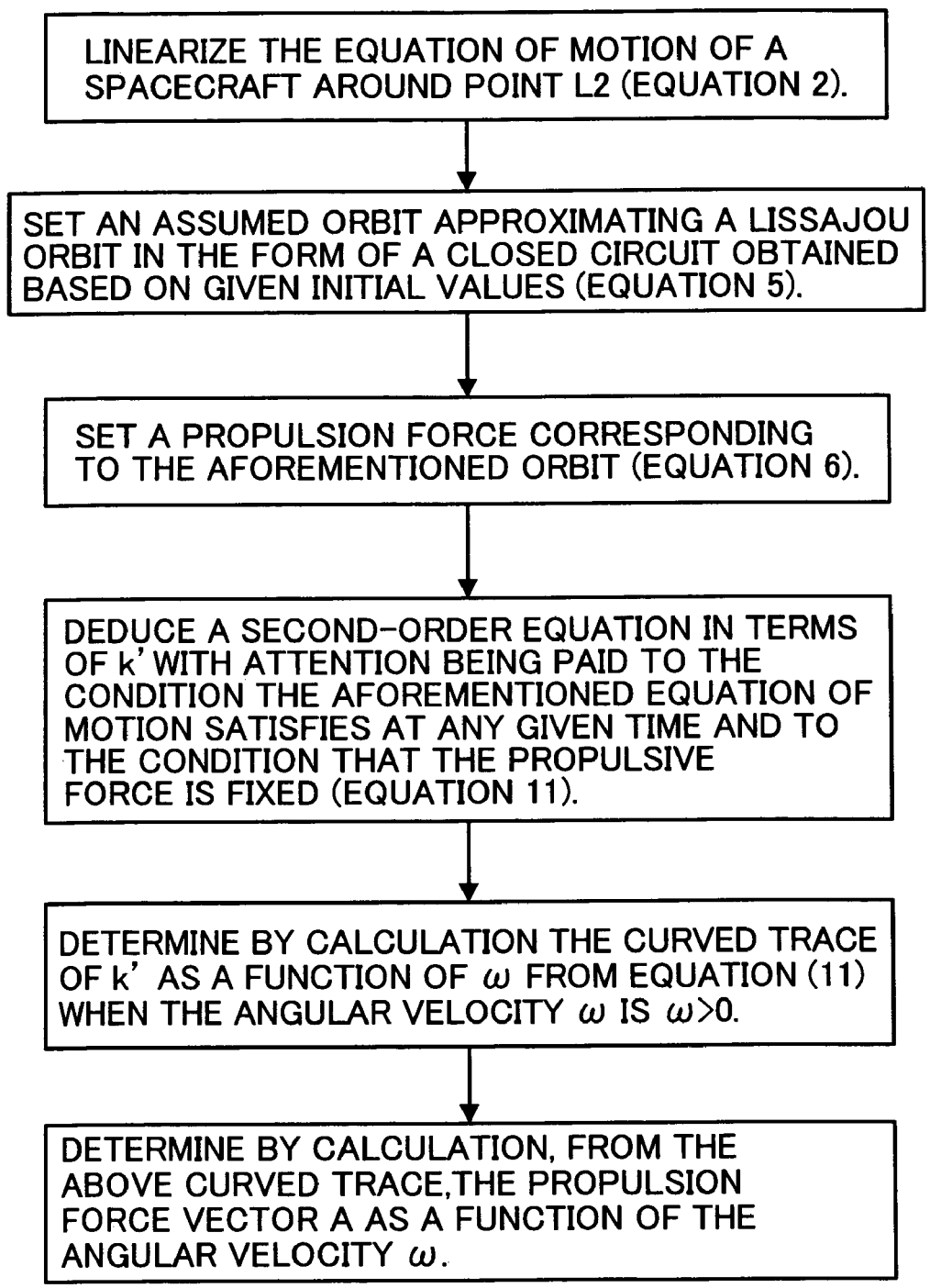
FIG. 4 gives a flowchart of steps necessary for realizing a halo orbit at a close proximity of a Lagrange point.

FIG. 4 shows a flowchart of steps given above which are undertaken for determining a propulsion vector necessary for enabling a spacecraft to attain an intended orbit. According to the inventive orbit design method, an information can be obtained with regard to a propulsion vector, that is, at which instance the thrust should be applied, and what magnitude the thrust should be with respect to the rotating coordinate system that is constituted based on the fixed axis corresponding to the Sun-Earth line. The angular velocity rate is a subordinate parameter determined based on the aforementioned information.

Needless to say, the way to acquire a solution according to the inventive orbit design method is not limited to the embodiment shown in FIG. 4, but may be achieved by any other appropriate method.

In a particular case, that is, in the most preferred embodiment, it is desirable for the acceleration to stay in a specified plane. Such an example will be deduced from FIG. 6. As shown in the figure, when ω=1.7136 or 2.0082, $a_x=0$, that is, the propulsion force rotates about x-axis. Namely, this indicates that the propulsion thrust force vector is confined perpendicular to the Sun-Earth line. The spacecraft orbit results in a circular orbit at a constant angular velocity. What is noteworthy in relation to this case is that the orbit does not completely stay in the plane perpendicular to x-axis, while the thrust in on the plane.

Another particularly preferred embodiment similar to the one described in the preceding paragraph can be deduced from FIG. 6. As shown in the figure, when ω=1.976, $a_z=0$. This refers to the case where the propulsion thrust force rotates about z-axis.

Figure 8:
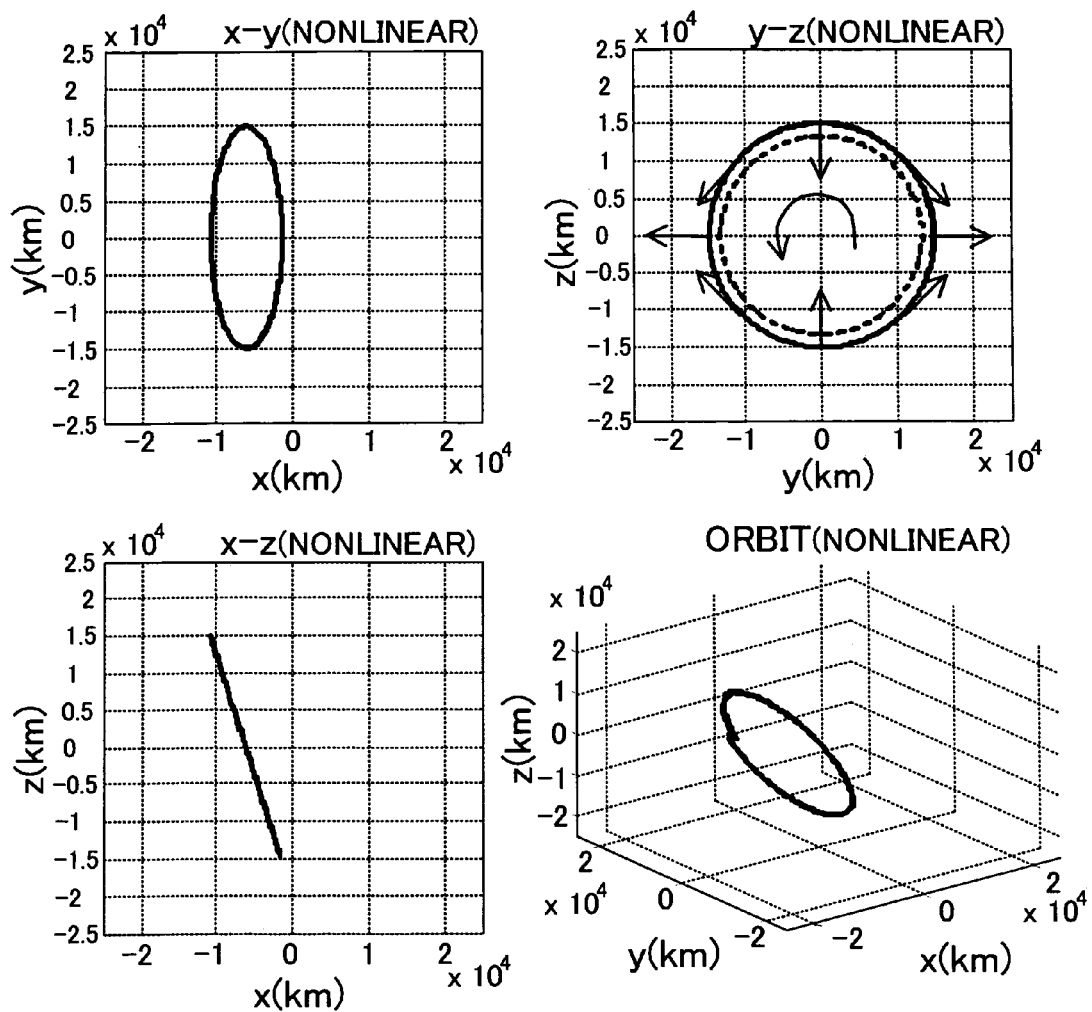
FIG. 8 illustrates the trajectory of an orbit obtained if $\omega$=2.0082, and the symbol of z solution is assumed to be negative.

If equation (4) is solved, for example, based on ω=2.0082 in relation to the description given in the second preceding paragraph, and also if z is negative and is inserted into the non-linear equation (1), a trajectory as shown in FIG. 8 is obtained. This trajectory is obtained by inserting numerical values into the equations representing the non-linear motion (1). In the following description, AU represents astronomical unit, that is, a distance of about 150 million km.

The initial values are assumed to take following values:

$$x=(-6190.0843209 \text{ (km)/AU}, 15000 \text{ (km)/AU}, 0), v=(\omega*k'*y(0), 0, -\omega*y(0)).$$

In this case, the quasi equilibrium point is at 6190 km off from the point L2. Control of the motion must be such that k' is 0.31283; the period of 181.88 days; its amplitude $7.6245*10^{-8}$ (m/s$^2$); and total ΔV 2.4045 (m/s) per year, which corresponds to 1.1981 (m/s) for every revolution. Due to the control as described above, the spacecraft orbit takes a small-radius halo locus having a radius of about 15,000 km with the center around the site near the point L2. The acceleration given to the spacecraft is about $10^{-7}$ m/s$^2$. This corresponds, when the mass of the spacecraft is assumed to be 1 ton, to only 0.1 mN, a sufficiently small force. This acceleration value is so small that even a small propulsion mechanism could easily attain the trajectory. Even if the mechanism works relying on fuel, the fuel cost for the performance would be negligible. Moreover, since the orbit has a radius over 15,000 km, the spacecraft on the orbit safely avoids the shadow owing to the Earth.

Figure 9:
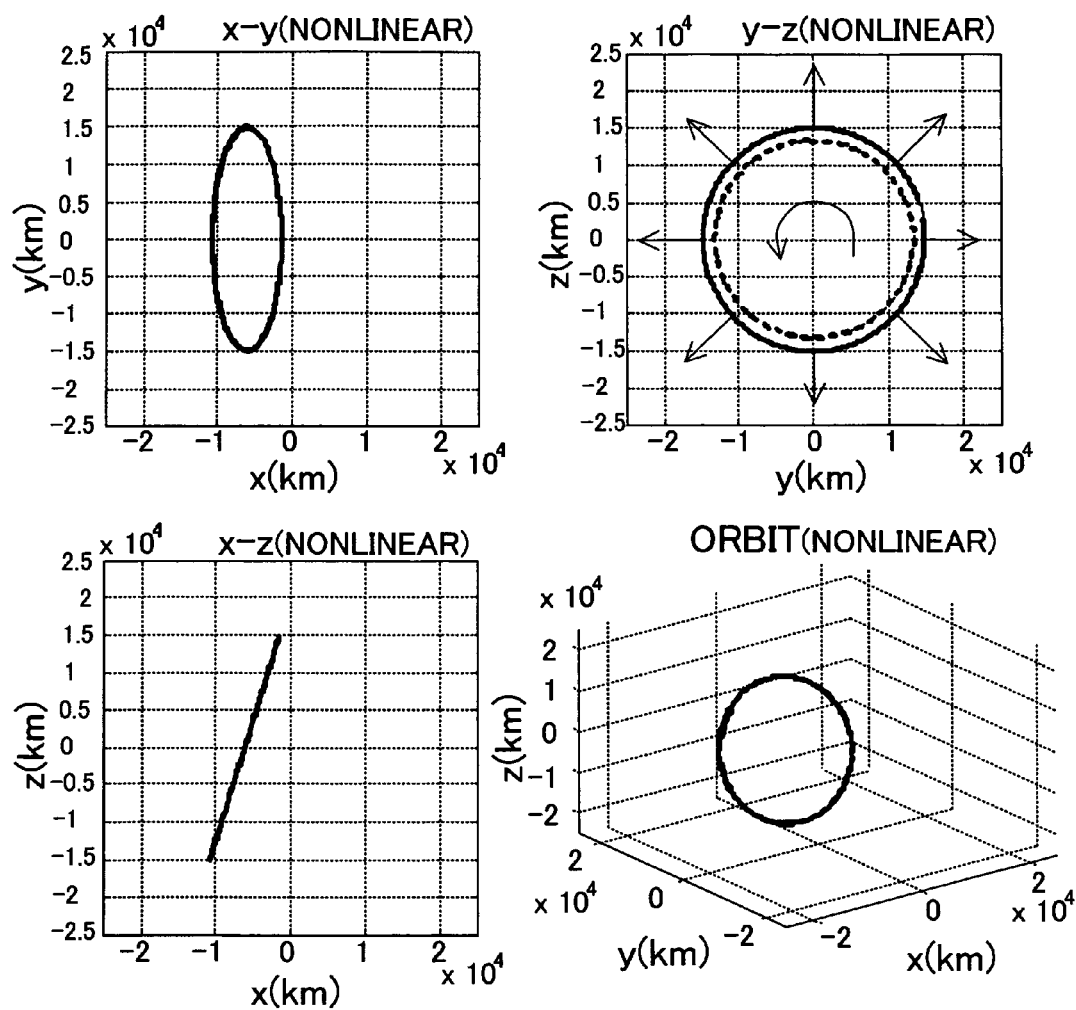
FIG. 9 illustrates the trajectory of an orbit obtained if $\omega$=2.0082, and the symbol of z solution is assumed to be positive.

In the same manner, equation (4) is solved assuming that z obtained as a solution is positive, and a trajectory obtained as a result is shown. In this case, the symbol (−) attached to the component $a_z$ of initial propulsion force vector is replaced with the opposite symbol (+). The result is shown in FIG. 9. When the current orbit is compared with the preceding one, the following differences are noteworthy: the direction of revolution is reversed, when the image is projected and seen on x-y plane (see FIG. 3 for the coordinate system) changes.

Figure 10:
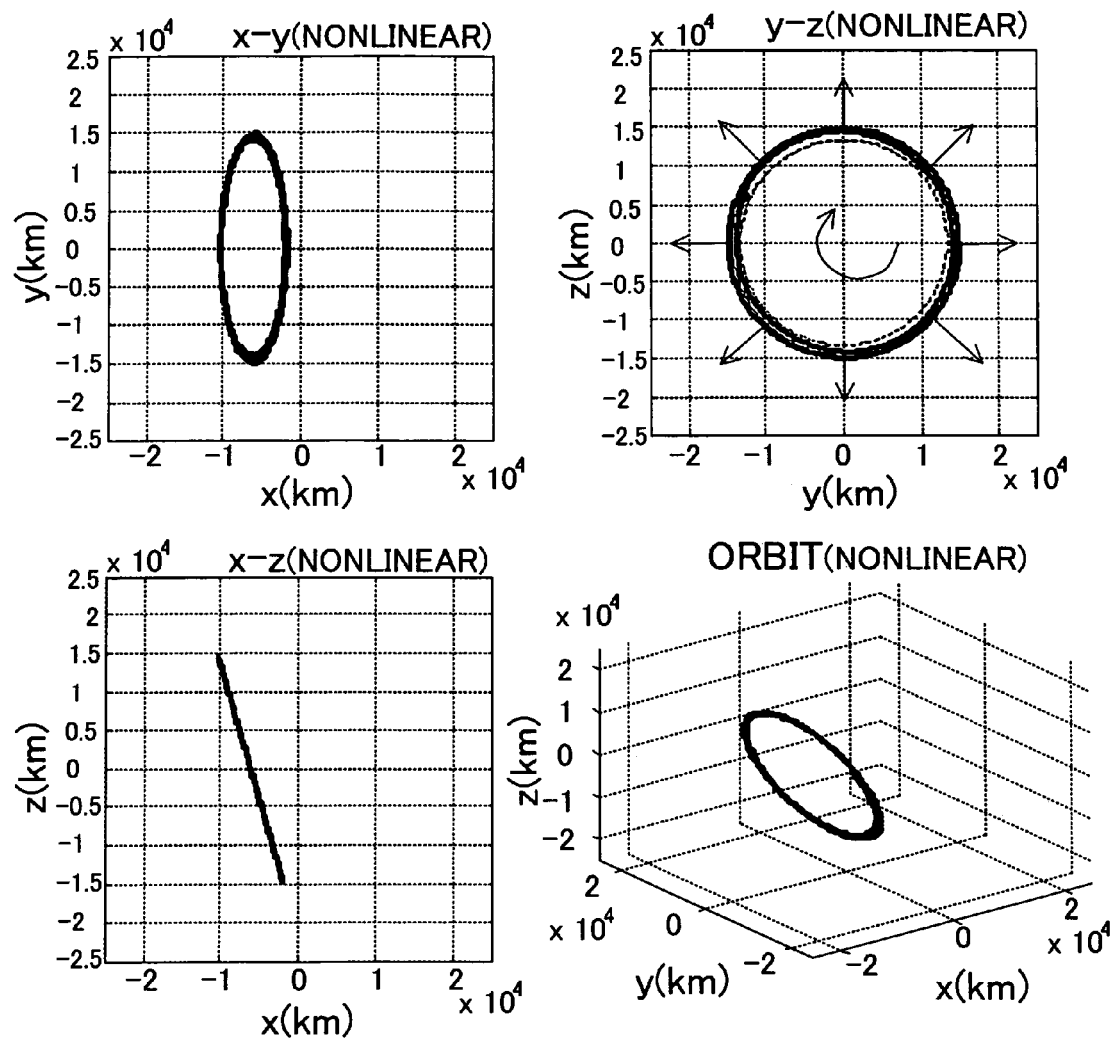
FIG. 10 illustrates the trajectory of an orbit obtained if $\omega$=1.7136, and the symbol of z solution is assumed to be negative.

In the same manner as in the preceding paragraphs, equation (4) is solved based on ω=1.7136, with z taken negative, and a resulted trajectory is shown in FIG. 10. The initial values are assumed as follows:

$$x=(-6185.9645184 \text{ (km)/AU}, 15000 \text{ (km)/AU}, 0),\\ v=(\omega*k'*y(0), 0, -\omega*y(0)).$$

In this case, the quasi equilibrium point is at 6190 km from the Lagrange point L2 in the Sun-Earth system. Control of the motion occurs such that k' becomes 0.29178; whose corresponding period is 213.15 days; with the acceleration of $5.7571*10^{-7}$ (m/s$^2$); and the resulted total yearly of ΔV 18.156 (m/s), which corresponds to 10.602 (m/s) for every revolution. This correction velocity is larger by one order than that in the preceding case, but is still so small as to be feasibly operated even via a small propulsion mechanism.

The trajectory in the second preceding paragraph, when particularly the orbit is projected on the y-z plane (see FIG. 3 for the coordinate system), is characterized by the direction of the thrust force that corresponds to the radial direction on this projection plane. Namely, if the direction of thrust force is fixed with respect to the spacecraft body, practically the spacecraft body axis can be aligned in parallel with the radial direction on the projection plane.

This feature is particularly useful for an astronomy satellite, because it helps simplify the trajectory maneuver embedded in the slow and constant spin motion around the single axis perpendicular to the projection plane.

This feature is also very useful for a space dock (space port) potentially built near the Lagrange point L2, because it facilitates the space dock more practically and conveniently. Assume a space dock is built, from which spacecraft leave for deep space near Lagrange point L2. If the space dock should have its in-and-out ports (openings) toward the radial direction on the projected plane, while the dock revolves around the Sun-Earth axis once half a year, the station keeping maneuver is automatically embedded in articulating the dock ports orientation with an appropriate propulsion outlet open along the dock port axis. If a space dock is built and operated according to the inventive orbit design and station keeping method, it will be possible to keep its in and out openings directed toward the equilibrium point, and then it will be possible for spaceships approaching the dock to easily access to the openings of the dock, provided that those spaceships pass through the center, the equilibrium point to trace a line to and from the openings. This feature will also be very helpful in controlling the traffic of spaceships entering/leaving into/from the dock.

In the same manner as in the second preceding paragraph where ω=2.0082 and equation (4) is solved assuming that z obtained as a solution is positive, the resulting orbit, when projected on x-y plane, changes its direction of rotation contrary to the direction in the previous one.

Now, the relationship of the orbit with $a_x=0$ and the projected locus on the y-z plane as well as the direction of thrust are summarized below. As described above, y and z components are represented by equation (4) as.

$$y(t)=y(0)\cos \omega t, \ z(t)=\pm y(0) \sin \omega t$$

The thrust is represented by the equation (6) as.

$$a_y=(-\omega^2+B_L-1+2\omega k')y(0)\cos \omega t, \quad a_z=\mp(\omega^2-B_L)y(0)\sin \omega t$$

From these, it is possible to summarize the relationship of the orbit with the corresponding attitude motion is shown in Table 1 below.

TABLE 1

Relationship of orbit of spacecraft with the corresponding attitude motion

|  | ω = 1.7136 | ω = 2.0058 |
|---|---|---|
| z(−) | [diagram] | [diagram] |
| z(+) | [diagram] | [diagram] |

According to the orbit design and the station keeping methods of the invention, it is revealed that with regard to the orbit obtained when ω=1.7136, the spacecraft position direction on the orbit coincides with the direction of thrust, while with regard to the orbit obtained when ω=2.0058 the spacecraft position direction on the orbit oppositely rotates to the direction of thrust. It is also revealed that although the orbit obtained when ω=1.7136 is useful for the claimed purpose, Δ V for the orbit is larger by one order than that corresponding to the orbit obtained when ω=2.0058.

The initial values for the orbit shown in FIG. 9 are:

$x=(-1564.72089$ (km)/AU, 15000 (km)/AU, 0), $v=(\omega^* k'^* y(0), 0.000047, -\omega^* y(0))$.

The corresponding initial values in FIG. 10 are:

$x=(-1477.8948$ (km)/AU, 15000 (km)/AU, 0), $v=(\omega^* k'^* y(0), 0.000047, -\omega^* y(0))$.

For convenience, the start time is set at Jul. 1, 2005.

Figure 11:
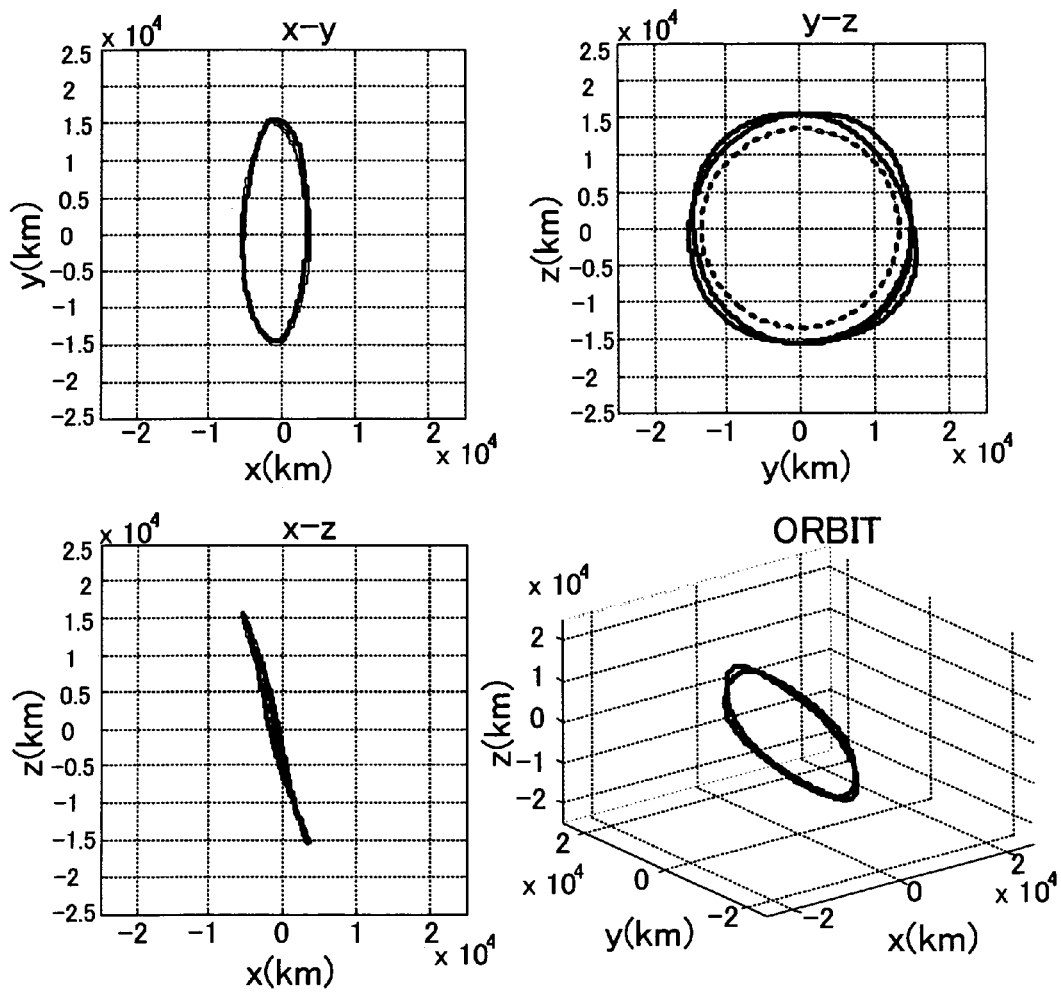
FIG. 11 illustrates how the inventive method can be applied to design an orbit in the real celestial system comprising the Sun, Earth and Moon.
Figure 12:
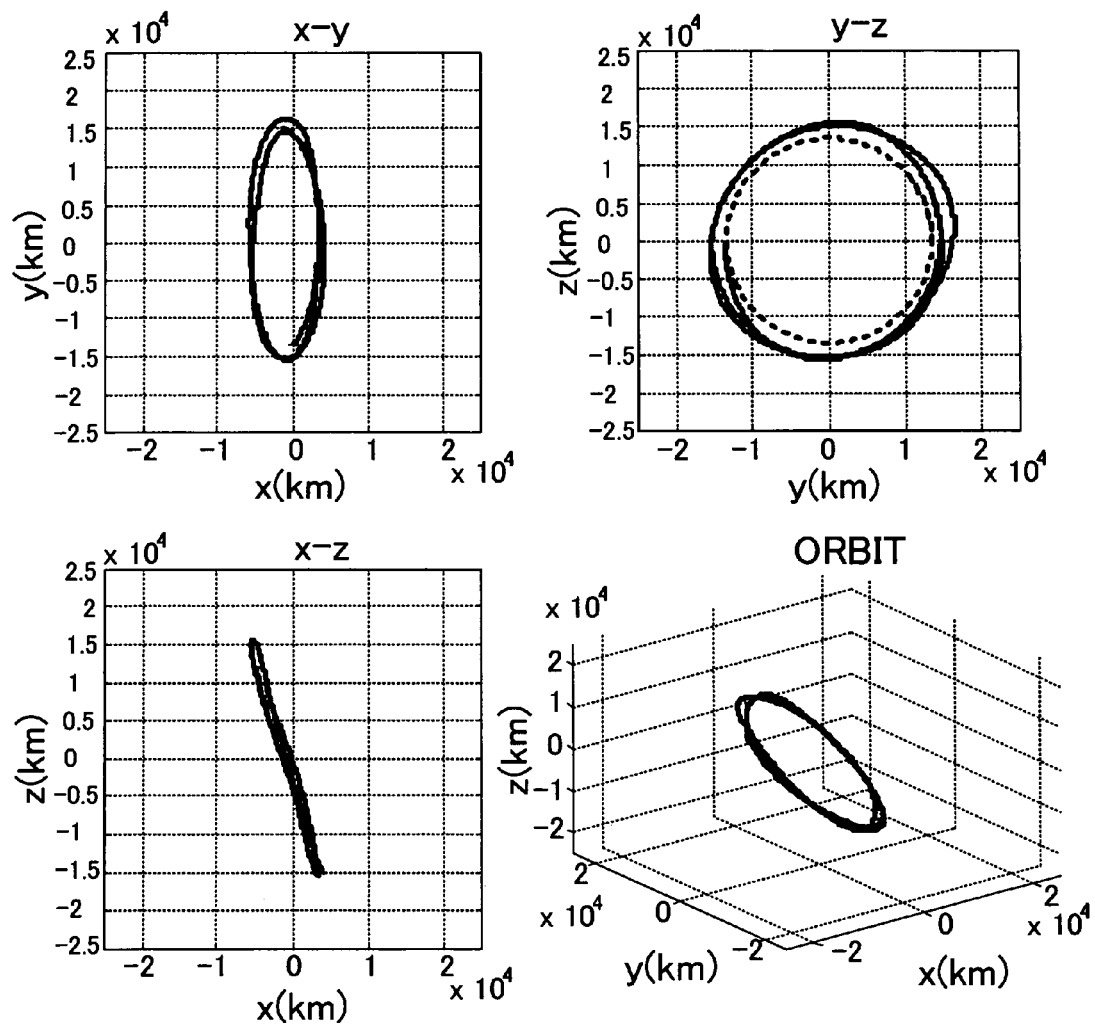
FIG. 12 illustrates another application of the inventive method for designing an orbit in the real celestial system comprising the Sun, Earth and Moon.

FIGS. 11 and 12 represent how the inventive method can be used to design an orbit in the celestial system comprising the Sun, Earth and Moon. In the upper right corner of the figure, there is drawn a dotted line which represents an ideal orbit based on the ideal model of motion of the invention (based on the mathematical model explained above). However, in reality, the orbit of the Earth is not circular, and the motion of the Earth is also affected by the gravity of Moon. To validate the practical applicability of the inventive method, it is necessary to verify whether an orbit obtained by the inventive method corresponds to an orbit simulated by a precise model of motion within the practically permissible range of error. The trajectories drawn by solid lines represent the corresponding orbits simulated by certain precise models of motion. The difference between the two kinds of orbits is so small that the inventive method is practically applicable.

Figure 13:
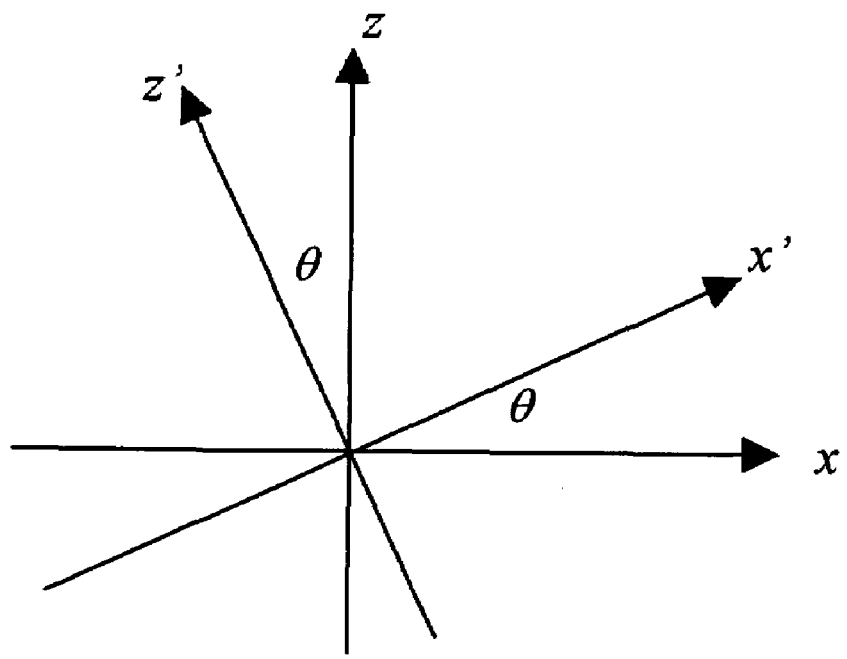
FIG. 13 illustrates coordinate transformation by which a circular orbit is depicted on a second plane.

In solving equation (4), the locus projected on the y-z plane is assumed to be circular. Here the discussion is generalized more. As seen from the coordinate transformation shown in FIG. 13, the second plane, on which the trajectory is projected and expected to draw a circle, may be implemented perpendicular to an axis $(\cos\theta, 0, \sin\theta)^T$ on the first plane. Then, it is necessary to obtain the following equation.

$$z'=\pm y_0 \sin\omega t, \quad x'=\beta z', \quad y=y_0 \cos\omega t \qquad \text{Equation (13)}$$

When the above equation is analyzed, the following equation is obtained.

$$x=\pm y_0 \sin\omega t(\beta\cos\theta-\sin\theta), y=y_0\cos\omega t, z=\pm y_0\sin\omega t(\cos\theta+\beta\sin\theta) \qquad \text{Equation (14)}$$

They should be inserted into equation (2). In the above equation, $\beta$ represents a redundant degree of freedom which disappears when the orbit is projected to the aforementioned second plane on which the projected image should be expected circular, and satisfies the following equation.

$$(x,y,z)(\cos\theta, 0, \sin\theta)^T = \pm\beta_{y_0}\sin\omega t = x' \qquad \text{Equation (15)}$$

If the control thrust is assumed to rotate at a constant angular velocity on the plane perpendicular to the axis $(\cos\theta, 0, \sin\theta)^T$, the following equation should hold.

$$a^T = (\alpha\sin\theta\sin\omega t, \alpha\cos\omega t, -\alpha\cos\theta\sin\omega t) \qquad \text{Equation (16)}$$

Indeed, $a^T(\cos\theta, 0, \sin\theta)^T = 0$, which indicates that the direction of control thrust also resides on the second plane in question, on which the trajectory is projected to draw a circle.

As an alternative of the coordinate transformation discussed above, it is possible to rotate x-z plane of the first coordinate or the first plane by angle $\theta$ to produce a second plane perpendicular to the axis on the first plane, and to assume the orbit projected on the second plane to be circular, by implementing a redundancy degree of freedom as described above. Thus, according to this method, it is possible to design an orbit on the second plane by introducing auxiliary parameters such as angular velocity $\omega$ and redundant degree of freedom $\beta$.

The feature of the invention in summary of the invention also includes the versatility of the inventive method described above transferring a given projected circle to a different plane via coordinate transformation.

For a special case where the use of a redundant degree of freedom is discarded and $\beta=0$ is assumed, the angular velocity $\omega$ and angle $\theta$ or an angle defining a second plane with respect to a first plane are automatically determined so that the orbit projected on the second plane be circular and the control thrust coexists on the same plane.

As seen from above, according to the inventive method, it is possible to present, in concrete terms, how the maneuver thrust should be applied in terms of how much thrust, so that the locus projected can show a desired small-radius halo orbit in the rotating coordinate system based on the fixed Sun-Earth line.

One promising application expected from the inventive method relates to an observatory satellite capable of scanning the entire heavenly space. This can be achieved even by a satellite drawing a circle on the y-z plane, because the y-z plane rotates relative to the celestial sphere along with the revolution of the Earth.

The inventive orbit design method has been described specifically for the Sun-Earth system, whose L1 or L2 point has been discussed. However, the inventive method can also be applied to for arbitrary two celestial bodies system, which revolves around each other and satisfies the basic assumptions mentioned at the beginning. The method of the present invention has a wide applicability.

The inventive method has been described in terms of the Sun-Earth system. However, the inventive system is not limited to the aforementioned system. The technical concept underlying the inventive method can also be applied for any heavenly system comprising two celestial bodies where one celestial body turns around the other celestial body. For example, the inventive method can be applied, in addition to the Sun-Earth system, to the Earth-Moon system and the Sun-Jupiter system, and so on.

The spacecraft whose trajectory in other word station is controlled by the inventive method preferably carries a high performance engine (capable of providing larger amount of velocity increment with small amount of fuel) as its propulsion mechanism, such as an ion engine. According to the inventive method, the thrust required to place a spacecraft of 1 ton in mass on the desired orbit discussed is about only 0.1 mN, which corresponds to the electric output of several tens wattage for conventional ion engines. Even if it is required to run the spacecraft for ten years, the mass of operation gas such as Xenon for ion engines is negligibly small. Thus, the inventive method can be very practical.

The thrust required to place a spacecraft of 1 ton on the desired orbit discussed will be about 0.1 mN, which corresponds to the solar radiation pressure force via a solar panel of 20 m$^2$ tilted by 30 degrees to the sun beam. From this, possibly the best embodiment of the invention may occur when a spacecraft includes a small solar sail as its propulsion mechanism. According to this embodiment, the spacecraft does not consume any fuel and does not need any propulsion mechanism. Particularly, in this case, the solar sail works as a substitute for solar cells which will help the structure of the spacecraft simplified and reduced.

To find a proper orbit according to the inventive orbit design method, it is necessary to obtain it by the calculation of the numerical data on a propulsion force vector required for transferring the spacecraft to the proper orbit based on the equation of motion of the spacecraft around a Lagrange point. The required calculation may be achieved by a computer-based system. The computer included in the system is not limited to any specific one but may include an ordinary computer including a bus, processor, memory, disk, input/output port, network interface, etc.

According to the inventive method, under a restricted condition where the thrust magnitude from the propulsion mechanism aboard the spacecraft is fixed, and the thrust rotates at a constant angular velocity, it is still possible to obtain a small-radius halo orbit, based on the equations of motion near a Lagrange point. If this method is applied to a spacecraft placed close to a Lagrange point of the system comprising two celestial bodies where the first body is represented by the Sun, and the second celestial body by the Earth, it is possible to place the spacecraft on an orbit which enables the spacecraft to avoid the passage across the surface of Sun and shadow by the Earth, and to be stationary geometrically relative to the Sun and the Earth.

According to the inventive method, it is possible to obtain the intended desired orbit by rotating a spacecraft at a constant angular velocity on the plane perpendicular to the line connecting the two celestial bodies (e.g., Sun and Earth) even by virtue of a fixed magnitude thrust provided by a propulsion mechanism aboard the spacecraft.

According to one of preferred embodiments of the invention, in order to keep the orbit of the spacecraft to stay close to a Lagrange point, the spacecraft has only to rotate along a circular halo orbit with the direction of thrust having a fixed magnitude corresponding to a radial direction of the orbit. With regard to the spacecraft, this is realized by making the aperture of its telescope or its docking port be aligned with the direction of required manipulations, or of the propulsive mechanism within, which will help the configuration and the structure of the spacecraft greatly simplified as compared with conventional spacecraft.

As described above, the inventive method enables, even under a relatively restrictive condition where the thrust exerted by a propulsion mechanism is kept constant and the angular velocity of spacecraft is also kept constant, a spacecraft to be kept close to a Lagrange point by placing the spacecraft on a small-radius circular halo orbit of a closed circuit, which is selected out of feasible planes candidates, where the direction of thrust acceleration complies with a certain desired range.

The present invention will be greatly helpful not only for advancing an international mission for placing a big telescope in space or group of spacecraft and facilities, that is, the mission the Japanese government aims at putting in practice in the future, but also for putting multi-purpose ports in space which will play a leading role in the exploration for deep space such as solar system.

What is claimed:

1. An orbit design method for placing a spacecraft in an orbit comprising:

identifying a celestial system comprising a first body and a second body in a cosmic space where both bodies turn around a barycenter, the barycenter being a center of masses of the two bodies, both bodies in a circular orbit, and a spacecraft equipped with a propulsion mechanism residing on a first line connecting the two bodies, around an equilibrium point near the second body; and implementing a coordinate system with respect to the celestial system such that the first line connecting the first and second celestial bodies is made a fixed axis, a second axis perpendicular to the fixed axis is included on a revolution plane of the two bodies, and a second line perpendicular to the revolution plane is made a third axis, with a plane spanned by both the fixed and third axes being made a first plane, where the spacecraft is located close to a Lagrange point on the fixed axis, where a gravity from the two bodies is balanced with a centrifugal force resulting from a revolution motion, wherein the propulsion mechanism of the spacecraft is continuously activated during orbit such that a propulsion force vector having a specified fixed magnitude is allowed to rotate at a specified fixed angular velocity so as to make the orbit of the spacecraft projected onto a second plane depict a non-Keplerian and circular halo orbit in a form of a closed small-radius circuit maintaining a passive stability location characteristic associated with a Lissajous orbit, the second plane being a plane perpendicular to any arbitrary line on the first plane spanned by both the fixed axis and the third axis.

2. The orbit design method according to claim 1, wherein a control of the orbit of the spacecraft is performed such that a direction of the propulsive force vector applied to the spacecraft coincides with a radial direction of the circular orbit obtained by projection of an original orbit to the second plane perpendicular to the arbitrary line on the first plane, wherein the control is a maintenance free maneuver that is capable of correcting the trajectory continuously.

3. An orbit design method for placing a spacecraft in an orbit comprising:

identifying a celestial system comprising a first body and a second body in a cosmic space where both bodies turn around a barycenter, the barycenter being a center of masses of the two bodies, both bodies in a circular orbit, and a spacecraft equipped with a propulsion mechanism residing close to on a first line connecting the two bodies, around an equilibrium point near the second body; and implementing a coordinate system with respect to the celestial system such that the first line connecting the first and second celestial bodies is made a fixed axis, a second axis and a first axis are included on a revolution plane of the two bodies, and a second line perpendicular to the revolution plane is made a third axis with a plane spanned by both the fixed and third axes being made a first plane, where the spacecraft is located on the fixed axis, around an equilibrium point near the second body, where a gravity from the two bodies is balanced with a centrifugal force resulting from a revolution motion, wherein the propulsion mechanism of the spacecraft is continuously activated during orbit such that a propulsion force vector having a specified fixed magnitude is allowed to rotate at a specified fixed angular velocity so as to make the orbit of the spacecraft projected onto a second plane depict a non-Keplerian and circular halo orbit in a form of a closed small-radius circuit maintaining a passive stability location characteristic associated with a Lissajous orbit, the second plane being a plane perpendicular to the fixed axis on the first plane.

4. The orbit design method according to claim 3, wherein a control of the orbit of the spacecraft is performed such that a direction of the propulsive force vector applied to the spacecraft coincides with a radial direction of the circular orbit obtained by projection of an original orbit to the second plane perpendicular to the fixed axis on the first plane, wherein the control is a maintenance free maneuver that is capable of correcting the trajectory continuously.

5. The orbit design method according to claim 3, wherein the spacecraft is a space facility staying close to a Lagrange point.

6. The orbit design method according to claim 1, wherein the spacecraft is an observatory satellite staying close to a Lagrange point and aiming at scanning an entire heavenly space.

7. The orbit design method according to claim 3, wherein the spacecraft is an observatory satellite staying close to a Lagrange point and aiming at scanning an entire heavenly space.

8. The orbit design method according to claim 1, wherein the first body is the Sun and the second body is the Earth.

9. The orbit design method according to claim 3, wherein the first body is the Sun and the second body is the Earth.

* * * * *